(12) United States Patent
Van Beek et al.

(10) Patent No.: US 12,365,156 B2
(45) Date of Patent: Jul. 22, 2025

(54) BEAD SEPARATOR, BEAD SUPPLY STATION AND A METHOD FOR SEPARATING A SINGLE BEAD FROM A BEAD SUPPLY UNIT HOLDING A PLURALITY OF BEADS

(71) Applicant: VMI Holland B.V., Epe (NL)

(72) Inventors: Willem Marinus Van Beek, Epe (NL);
Timen Anton Van Werven, Epe (NL);
Robin Nusselder, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/705,414

(22) PCT Filed: Oct. 31, 2022

(86) PCT No.: PCT/NL2022/050610
§ 371 (c)(1),
(2) Date: Apr. 26, 2024

(87) PCT Pub. No.: WO2023/090998
PCT Pub. Date: May 25, 2023

(65) Prior Publication Data
US 2025/0115017 A1    Apr. 10, 2025

(30) Foreign Application Priority Data

Nov. 17, 2021 (NL) ..................................... 2029786

(51) Int. Cl.
*B29D 30/00* (2006.01)
(52) U.S. Cl.
CPC .. *B29D 30/0016* (2013.01); *B29D 2030/0044* (2013.01)
(58) Field of Classification Search
CPC ...... B29D 2030/523; B29D 2030/3207; B29D 30/0016

(Continued)

(56) References Cited

U.S. PATENT DOCUMENTS 3,915,788 A      10/1975 Hirata et al.
4,260,940 A  *   4/1981 Engelberger .......... B23P 21/002
                                                                  318/590

(Continued)

FOREIGN PATENT DOCUMENTS

CN     115321197 A  * 11/2022  ......... B29D 30/0016
DE         1299411        7/1969  ............. B29H 17/22

(Continued)

OTHER PUBLICATIONS

Search Report issued in Netherlands Patent Appln. Serial No. 2029786, dated Jun. 24, 2022, 3 pages.

(Continued)

*Primary Examiner* — Joel D Crandall
(74) *Attorney, Agent, or Firm* — HAYES SOLOWAY P.C.

(57) ABSTRACT

Disclosed is a bead separator, a bead supply station and a method for separating a single bead from a bead supply unit holding a plurality of beads, wherein the bead separator has a first gripper for separating the single bead and a first gripper base for supporting the first gripper, wherein the first gripper has jaw members which are movable towards each other from opposite sides of a first gripper plane defined by the first gripper into a closed state for gripping the single bead in the first gripper plane, wherein the first gripper is movable relative to the first gripper base between an inner first gripping position in which the first gripper plane intersects with a first bead diameter position and an outer first gripping position in which the first gripper plane intersects with a second bead diameter position different from the first bead diameter position.

26 Claims, 6 Drawing Sheets

(58) Field of Classification Search
USPC ......... 269/164, 152, 140, 139, 130; 156/126
See application file for complete search history.

(56) References Cited

U.S. PATENT DOCUMENTS

| | | | | |
|---|---|---|---|---|
| 4,486,935 | A * | 12/1984 | Kashiwagi | B23P 19/048 29/227 |
| 4,790,719 | A * | 12/1988 | Portalupi | B29D 30/0016 211/23 |
| 5,313,745 | A * | 5/1994 | Mace, Jr. | B24B 5/366 451/52 |
| 5,711,083 | A * | 1/1998 | Bidwell | G01B 5/12 33/783 |
| 6,371,468 | B1 * | 4/2002 | Lessard | B25B 5/147 269/238 |
| 10,065,381 | B2 | 9/2018 | Slot et al. | |
| 2014/0363260 | A1 * | 12/2014 | Slot | B29D 30/0016 414/225.01 |
| 2022/0234317 | A1 * | 7/2022 | Bijl | B29D 30/0016 |

FOREIGN PATENT DOCUMENTS

| | | | |
|---|---|---|---|
| DE | 102006051540 | 5/2008 | ............ B29D 30/26 |
| JP | S49072378 A | 11/1972 | |
| JP | S59123645 | 7/1984 | ............ B29H 17/22 |
| JP | 2012250407 | 12/2012 | ............ B29C 33/02 |
| JP | 201539866 | 3/2015 | ............ B29D 30/32 |
| JP | 2015516323 A | 6/2015 | |
| KR | 100516022 B2 * | 2/2001 | ......... B29D 30/0016 |
| KR | 20100081598 A | 7/2010 | |
| WO | 2013172702 | 11/2013 | ............ B29D 30/00 |
| WO | WO-2015025728 A1 * | 2/2015 | ......... B29D 30/0016 |

OTHER PUBLICATIONS

International Search Report and Written Opinion issued in PCT/NL2022/050610, dated Jan. 16, 2023, 9 pages.
Notice of Refusal issued in Japan Patent Appln. Serial No. 2023-512201, dated Apr. 16, 2024, with machine translation, 8 pages.
Decision to Grant issued in related Japanese Application Serial No. 2023-512201, dated Oct. 8, 2024, with translation, 5 pages

* cited by examiner

BEAD SEPARATOR, BEAD SUPPLY STATION AND A METHOD FOR SEPARATING A SINGLE BEAD FROM A BEAD SUPPLY UNIT HOLDING A PLURALITY OF BEADS

BACKGROUND

The invention relates to a bead separator, a bead supply station and a method for separating a single bead from a bead supply unit holding a plurality of beads.

WO 2013/172702 A1 discloses a bead separator for removing a single bead from a bead supply unit holding a plurality of beads. The bead separator has two first bead separator grippers to grip the first bead at the bead supply unit and two second bead separator grippers to grip the second bead at the bead supply unit. Subsequently, the first bead separator grippers pull the first bead away from the plurality of beads, which are held back by the two second bead separator grippers. In this manner, it can be prevented that the relatively tacky material of the bead causes the beads to stick together during separation.

SUMMARY OF THE INVENTION

A disadvantage of the known bead separator is that the first bead separator grippers and the second bead separator grippers fixedly mounted to a base and are specifically designed to engage a bead at a fixed diameter. The bead supply unit may however hold a single batch of beads having different diameters or subsequent batches of beads having different diameters. When engaging a bead with a different diameter, the bead separator grippers may deform at least a part of said bead to a diameter different from the diameter of the bead, thereby potentially damaging said bead. When the diameter differs too much, one or more grippers may even fail to grip the bead in its entirety.

To prevent damage or failure to separate, the separation process has to be interrupted and the bead separator grippers have to be replaced with alternative bead separator grippers with each change in diameter.

It is an object of the present invention to provide a bead separator, a bead supply station and a method for separating a single bead from a bead supply unit holding a plurality of beads, wherein the flexibility of the bead separator to handle beads of different diameters can be improved.

According to a first aspect, the invention provides a bead separator for separating a single bead from a bead supply unit holding a plurality of beads, wherein the bead separator comprises a first gripper for separating the single bead from the rest of the plurality of beads in a separation direction and a first gripper base for supporting said first gripper, wherein the first gripper comprises a first jaw member and a second jaw member which are movable towards each other from opposite sides of a first gripper plane defined by the first gripper into a closed state for gripping the single bead in said first gripper plane, wherein the first gripper is movable relative to the first gripper base between an inner first gripping position in which the first gripper plane intersects with a first bead diameter position and an outer first gripping position in which the first gripper plane intersects with a second bead diameter position different from the first bead diameter position.

The first gripper can thus be moved to reposition or adjust the orientation of the first gripper plane relative to the first gripper base, in accordance with the bead diameter of the single bead to be gripped. In particular, the bead diameter position at which the first jaw member and the second jaw member ultimately meet can be adjusted from the first bead diameter position to the second diameter position, or to any bead diameter position in between.

In a preferred embodiment the bead separator is configured to allow the first gripper to passively move relative to first gripper base in response to contact of one of the first jaw member and the second jaw member with the single bead. In the context of this embodiment, the term 'passively' is to be interpreted as a movement that is not directly controlled and/or driven by a drive member. In other words, there is no dedicated drive for actively moving the first gripper relative to the first gripper base. Instead, the first gripper can passively adapt or adjust its orientation relative to the first gripper base, for example as a result of contact between the first gripper and the single bead. As such, there is no need to control, measure and/or check the orientation of the first gripper and/or the bead diameter of the single bead. The adjustment can be performed automatically by having the first gripper passively feel or follow the bead diameter of the single bead to be gripped.

In another embodiment, the outer first gripping position is above the inner first gripping position, wherein the first gripper is arranged to lift itself up from the inner r first gripping position towards the outer first gripping position or push itself down from the outer first gripping position towards the inner first gripping position as a result of contact of one of the first jaw member and the second jaw member with the single bead. Continued movement of the jaw members towards the first gripper plane and the reaction force as a result of the contact between one of the jaw members and the single bead can be conveniently used to drive the movement of the first gripper relative to the first gripper base.

In another embodiment the first gripper comprises a first jaw drive for moving the first jaw member and the second jaw member from an open state towards the closed state. Continued driven movement of the jaw members towards the first gripper plane and the reaction force as a result of the contact between one of the jaw members and the single bead can be conveniently used to drive the movement of the first gripper relative to the first gripper base.

In another embodiment the first gripper plane is reoriented and/or displaced when moving the first gripper from the inner first gripping position into the outer first gripping position. Hence, the first gripper can be lifted with its first gripper plane into a different orientation until, ultimately, both jaw members are engaged with and/or gripping the single bead from opposite sides of said first gripper plane.

In another embodiment the first gripper is rotatable relative to the first gripper base about a first gripper axis parallel to the first gripper plane and transverse or perpendicular to the separation direction. Although a linear movement of the gripper in a radial direction of the single bead is not excluded from the scope of the invention, it will be understood that it is less complex to allow a rotation of the first gripper about the first gripper axis compared to for example setting up a guide system that allows for a passive linear movement of the first gripper. Moreover, depending on the distance between the distal end of the first gripper and the first gripper axis, the rotation angle can be kept sufficiently small such that the movement of the distal end of the first gripper is predominantly in the radial direction of the single bead and the angular component is neglectable. Alternatively, the position of the first gripper base can be adjusted slightly to compensate for the angular component.

Preferably, at least one of the first jaw member and the second jaw member is rotatable relative to the other of the first jaw member and the second jaw member about a first jaw axis, wherein the first gripper axis is parallel or substantially parallel to said first jaw axis. The first gripper can thus be rotated in the substantially the same plane in which the at least one of the jaw members is opened and closed.

In another embodiment the bead separator further comprises a separator base for supporting the first gripper base, wherein the first gripper base is movable relative to the separator base in the separation direction. The first gripper base, and the first gripper supported thereon, can thus be retracted in the separation direction, away from the bead supply unit, to effectively separate the single bead from the rest of the plurality of beads.

In another embodiment the first gripper plane extends horizontally or substantially horizontally when the first gripper is in the inner first gripping position. Hence, the first bead diameter position extends at the same height at any position of the first gripper within the first gripper plane. In particular, the first gripper plane is parallel to the separation direction when the first gripper is in the inner first gripping position. More in particular, the first gripper plane extends parallel, transverse or obliquely to the separation direction when in one of the inner first gripping position and the outer first gripping position.

In another embodiment the first gripper is movable in a pick-up direction opposite to the separation direction into a pick-up position at the single bead, wherein the bead separator further comprises a stopper member that is arranged for moving together with the first gripper in the pick-up direction for contacting the single bead in said pick-up direction when the first gripper is in the pick-up position. The stopper member can physically abut the single bead and subsequently trigger the bead separator to stop moving the first gripper in the pick-up direction. In other words, the position of the single bead at the bead supply unit can be automatically detected. More in particular, the stopper member can signal when the first gripper is correctly positioned with respect to the single bead, i.e. in a position in which the jaw members, when moved into the close state, engage with the single bead.

In another embodiment the bead separator further comprises a second gripper for fixating the rest of the plurality of beads at the bead supply unit when the single bead is separated. The second gripper can effectively keep the rest of the plurality of beads back in the pick-up direction on the bead supply unit during the separation of the single bead from said bead supply unit.

Preferably, the second gripper comprises a first jaw member and a second jaw member which are movable towards each other from opposite sides of a second gripper plane defined by the second gripper into a closed state for gripping the first bead of the rest of the plurality of beads in said second gripper plane, wherein the second gripper is supported by and movable relative to a second gripper base between an inner second gripping position in which the second gripper plane intersects with a third bead diameter position and an outer second gripping position in which the second gripper plane intersects with a fourth bead diameter position different from the third bead diameter position. The second gripper can thus operate in the same way as the first gripper to automatically engage the first bead of the rest of the plurality of beads at the correct bead diameter, i.e. at the third bead diameter position, the fourth bead diameter position or any bead diameter position in between.

More preferably, the first gripper base is movable relative to the second gripper base in the separation direction. Hence, the spacing between the first gripper base and the second gripper base, and the respective grippers supported thereon, can be increased for the purpose of separating the single bead from the rest of the plurality of beads in the separation direction.

Alternatively, the second gripper comprises a single jaw member which is arranged to cooperate with the bead supply unit for gripping the first bead of the rest of the plurality of beads. In contrast to the aforementioned embodiments, the alternative second gripper according to this embodiment is limited to gripping the first bead at a fixed bead diameter position, for example the bead diameter position defined by the carriers of the bead supply unit. This can reduce the complexity of said second gripper.

In another embodiment the bead separator comprises a second gripper base for supporting the second gripper, wherein the bead separator further comprises a separator base for supporting the first gripper base and the second gripper base, wherein the second gripper base is movable relative to the separator base in a pick-up direction opposite to the separation direction. Hence, the spacing between the first gripper base and the second gripper base, and the respective grippers supported thereon, can be increased for the purpose of adjusting for wider or thicker beads. In the context of the claims, the width of thickness of a bead is measured in a direction parallel to the pick-up direction. A relative wide or thick bead may require more spacing between the respective grippers so that the second gripper can reach and grip the first bead of the rest of the plurality of beads behind the single bead to be separated.

In another embodiment the second gripper is located at a first side of the first gripper in a lateral direction parallel to the first gripper plane and perpendicular to the separation direction, wherein the bead separator further comprises a third gripper, at a second side of the first gripper opposite to the first side, for fixating the rest of the plurality of beads at the bead supply unit when the single bead is separated. The first bead of the rest of the plurality of beads can thus be held back or fixated at the bead supply unit in two positions along its circumference, with the first gripper peeling off the single bead to be separated in a position between the two positions associated with the second gripper and the third gripper.

Preferably, the second gripper and the third gripper are independently movable. Hence, if the bead diameter position of the first bead of the rest of the plurality of beads at the position of the second gripper is slightly different to the bead diameter position of the first bead of the rest of the plurality of beads at the position of the third gripper.

Additionally or alternatively, the bead separator comprises a common gripper base for supporting the second gripper and the third gripper, wherein the common gripper base is provided with a recess at the position of the first gripper base. Hence, the first gripper base has freedom of movement within said recess to move in the separation direction and/or the pick-up direction relative to and/or independently of the common gripper base.

According to a second aspect, the invention provides a bead supply station comprising the bead separator according to any one of the preceding claims and a bead supply unit for holding a plurality of beads.

The bead supply station includes the aforementioned bead separator and thus has the same technical advantages, which will not be repeated hereafter.

Preferably, the bead supply unit comprises at least one carrier extending in the separation direction for supporting the plurality of beads.

More preferably, the first gripper is movable parallel to the at least one carrier. The first gripper can thus pick up and separate the single bead parallel to said at least one carrier.

In an alternative embodiment, the bead supply unit further comprises a second gripper and/or a third gripper for fixating the rest of the plurality of beads at the bead supply unit when the single bead is separated. In contrast to the previous embodiments, the bead separator in this alternative embodiment does not have second or third gripper. Instead, said second and/or third gripper are provided on or associated with the bead supply unit. Consequently, the bead separator can be less complex. Moreover, the second and/or third gripper at the bead supply unit can retain the first bead of the rest of the plurality of beads from the same side of the single bead to be separated as the bead supply unit, which may allow for a further simplification of said second and/or third gripper.

According to a third aspect, the invention provides a method for separating a single bead from a bead supply unit holding a plurality of beads using the bead separator according to any one of the embodiments according to the first aspect of the invention, wherein the method comprises the steps of:
  moving the first jaw member and the second jaw member towards each other from the opposite sides of the first gripper plane into the closed state for gripping the single bead in said first gripper plane; and
  moving the first gripper relative to the first gripper base between an inner first gripping position and an outer first gripping position; and
  moving the first gripper in the separation direction to separate the single bead from the rest of the plurality of beads.

The method relates to the practical implementation of the bead separator according to the first aspect of the invention and thus has the same technical advantages, which will not be repeated hereafter.

In a preferred embodiment of the method the first gripper is passively moved relative to first gripper base in response to contact of one of the first jaw member and the second jaw member with the single bead.

In another embodiment of the method the outer first gripping position is above the inner first gripping position, wherein the first gripper lifts itself up from the inner first gripping position towards the outer first gripping position or push itself down from the outer first gripping position towards the inner first gripping position as a result of contact of one of the first jaw member and the second jaw member with the single bead.

In another embodiment the bead separator further comprises a second gripper, wherein the method further comprises the step of:
  fixating the rest of the plurality of beads at the bead supply unit with the second gripper when the single bead is separated.

Preferably, the second gripper is moved relative to the bead supply unit in a pick-up direction opposite to the separation direction, i.e. for the purpose of adjusting for a different bead width or thickness.

The various aspects and features described and shown in the specification can be applied, individually, wherever possible. These individual aspects, in particular the aspects and features described in the attached dependent claims, can made be subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1, 2, 3A, 3B and 3C show a bead supply station 100 according to a first embodiment of the invention for supplying annular beads B1-Bn to a downstream tire building station, i.e. a tire building drum (not shown).

Figure 2:
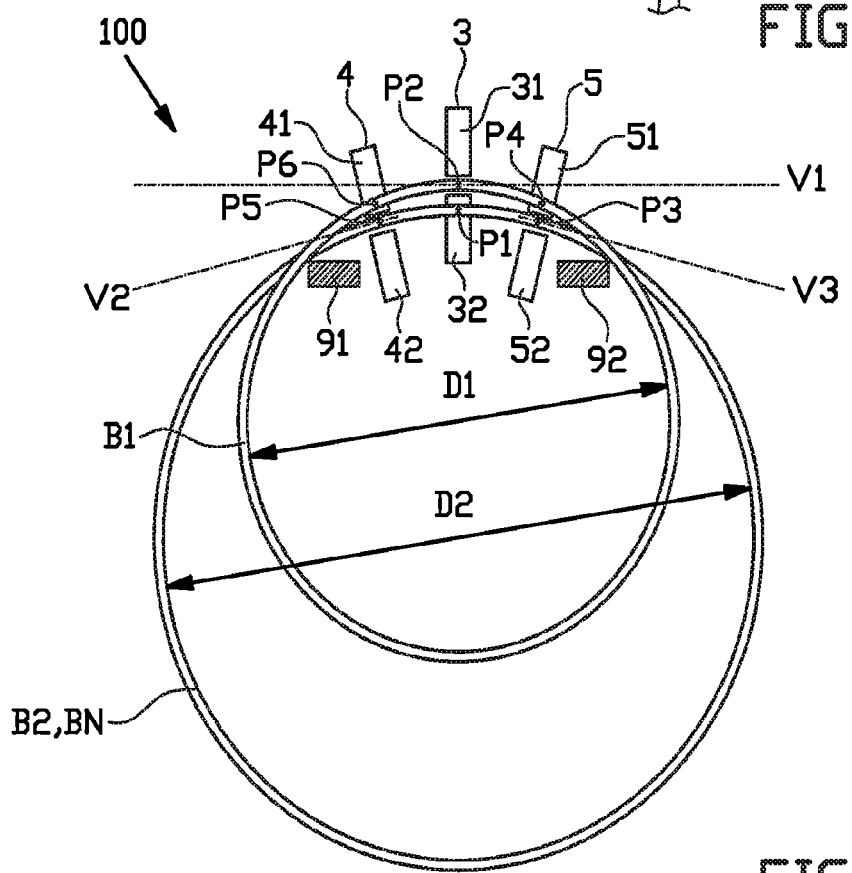
FIG. 2 shows a cross section of the bead separator and the bead supply unit according to the line II-II in FIG. 1.

The bead supply station 100 comprises a bead separator 1 and a bead supply unit 9. The bead supply unit 9 comprises a first carrier 91 and a second carrier 92 for carrying, receiving and/or holding a plurality of beads B1-Bn. In this exemplary embodiment, the carriers 91, 92 are elongate, mutually parallel rods that act as forks which are insertable into the center of the beads B1-Bn, supporting said beads B1-Bn at the circumference thereof. As best seen in FIG. 2, the beads B1-Bn may have different diameters D1, D2, resulting in said beads B1-Bn being support at different radii or bead diameter positions between the carriers 91, 92 of the bead supply unit 9. In other words, the centers of the beads B1-Bn are in different positions relative to the carriers 91, 92.

Alternatively, the carriers 91, 92 may be integrally formed or formed as a single carrier (not shown).

Figure 1:
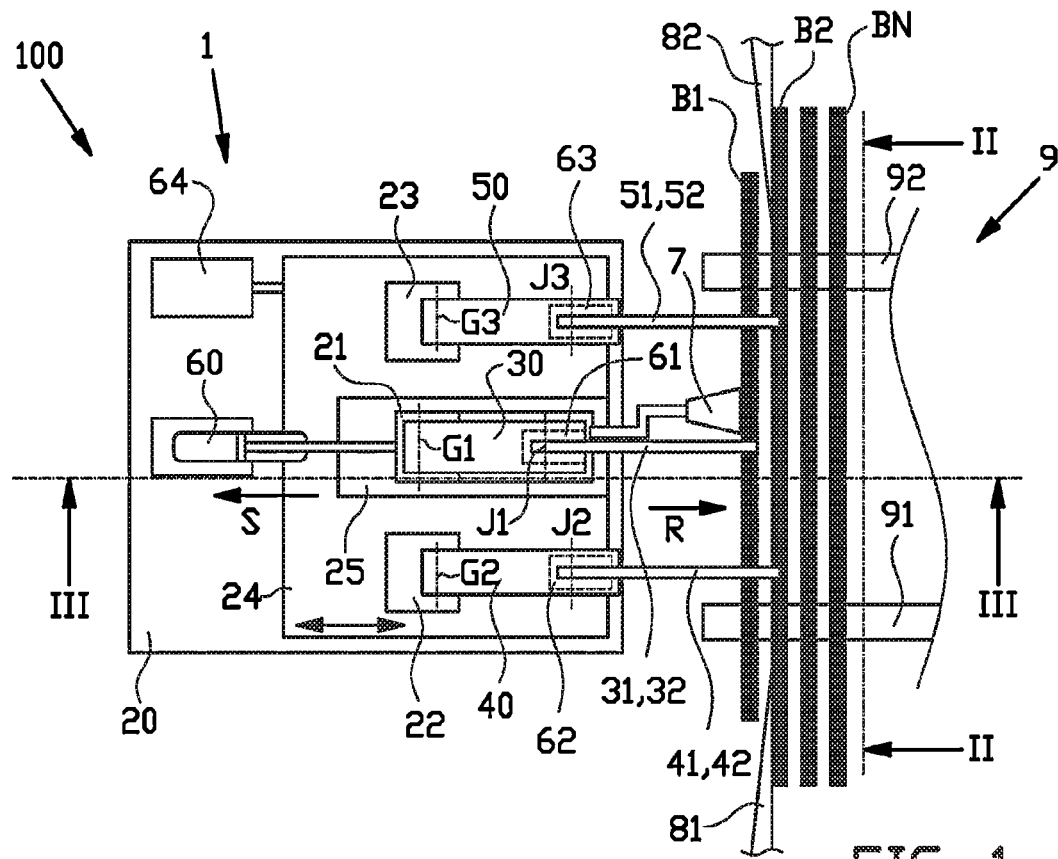
FIG. 1 shows a top view of a bead separator and bead supply unit according to a first exemplary embodiment of the invention.

As shown in FIGS. 1 and 2, the bead separator 1 comprises at least one first gripper 3 for separating a single bead B1 from the rest of the plurality of beads B2-Bn in a separation direction S. The bead separator 1 further comprises a second gripper 4 and a third gripper 5 for fixating or holding back the rest of the plurality of beads B2-Bn in said separation direction S. In particular, the second gripper 4 and the third gripper 5 are configured for gripper or engaging the first bead B2 of the rest of the plurality of beads B2-Bn, i.e. the next bead B2 supported on the bead supply unit 9 directly after the single bead B1 to be separated. In this example, the first gripper 3 is located in the middle between the second gripper 4 and the third gripper 5. In other words, the second gripper 4 and the third gripper 5 are located on opposite sides of the first gripper 3 in a lateral direction perpendicular to the separation direction S.

As shown in FIG. 2, the second gripper 4 and the third gripper 5 are tilted slightly into a position more or less radial to a bead with a minimum, maximum or average bead diameter. The tilt may be adjustable to account for the different bead diameters D1, D2. For reasons of simplicity, the second gripper 4 and the third gripper 5 are shown in the other drawings as if said grippers 4, 5 are operating in planes parallel to the plane of the first gripper 3, which in reality may be different radial planes.

In this exemplary embodiment, the separation direction S is horizontal or substantially horizontal. Moreover, the carriers 91, 92 extend parallel substantially parallel to said separation direction S.

As shown in FIG. 1, the bead separator 1 comprises a separator base 20 which may be placed on a ground surface, i.e. the factory floor (not shown). The bead separator 1 is further provided with a first gripper base 21, a second gripper base 22 and a third gripper base 23 for supporting the first gripper 3, the second gripper 4 and the third gripper 5, respectively, relative to the separator base 20. In this example, the second gripper base 22 and the third gripper base 23 are connected or integral and form a single or common gripper base 24 for the second gripper 4 and the third gripper 5. The common gripper base 24 is provided with a recess 25 at the position of the first gripper base 21.

As further shown in FIG. 1, the bead separator 1 is provided with a separation drive 60 to move the first gripper base 21 relative to the separator base 20 in the separation direction S and a pick-up direction R opposite to the separation direction S. In this example the separator drive 60 is a linear drive, i.e. a pneumatic cylinder. The bead separator 1 further comprises a gripper spacing drive 64 for moving the second gripper base 22, the third gripper base 23 or the common gripper base 24 in the separation direction S and the pick-up direction R to adjust the relative position of said bases 22, 23, 24 with respect to the first gripper base 21. The relative position of said bases 22, 23, 24 with respect to the first gripper base 21 may also be adjusted and fixed manually with appropriate means, such as a pin-and-hole adjustment, a manually operated spindle, a manually operated clamp or the like.

Figure 3A:
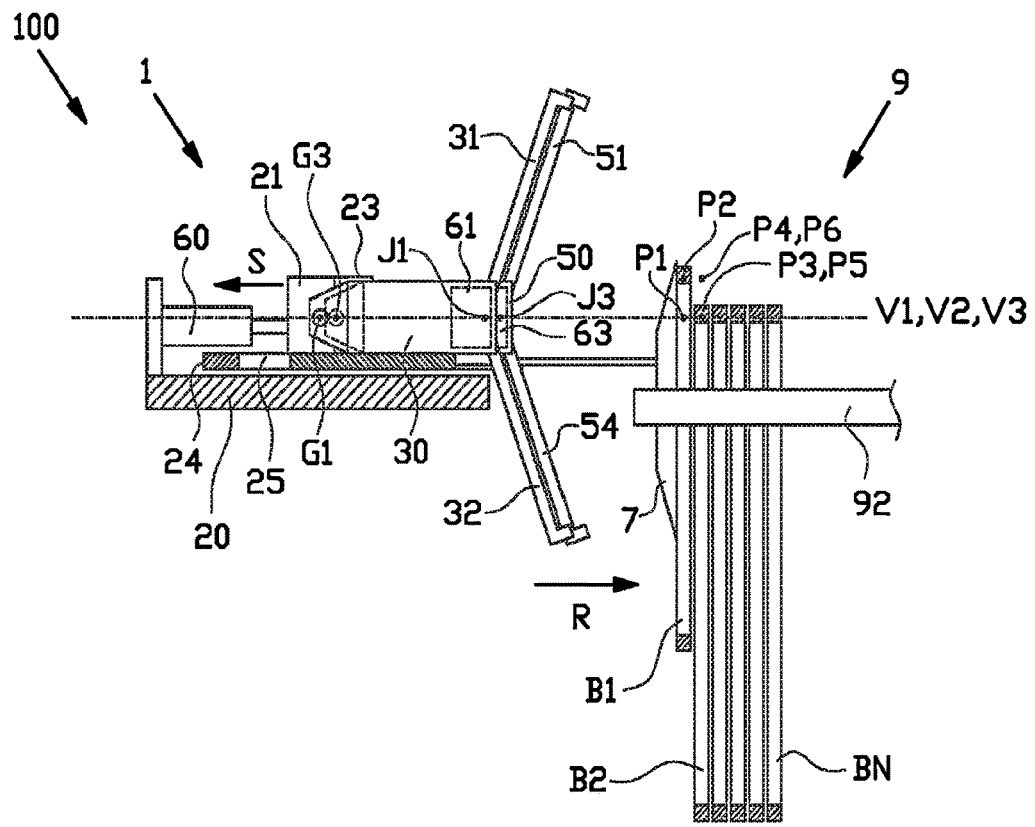
FIGS. 3A, 3B and 3C show cross sections of the bead separator and the bead supply unit according to the line III-III in FIG. 1 during the steps of separating a single bead from the bead supply unit.
Figure 3B:
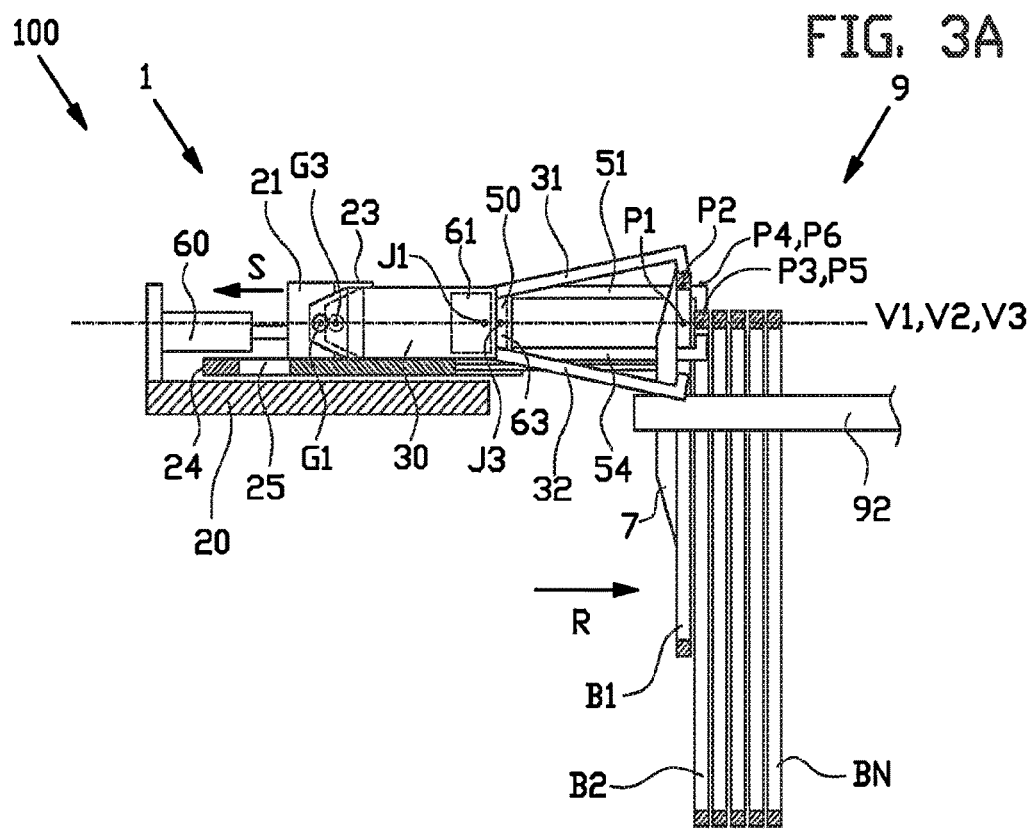
Figure 3C:
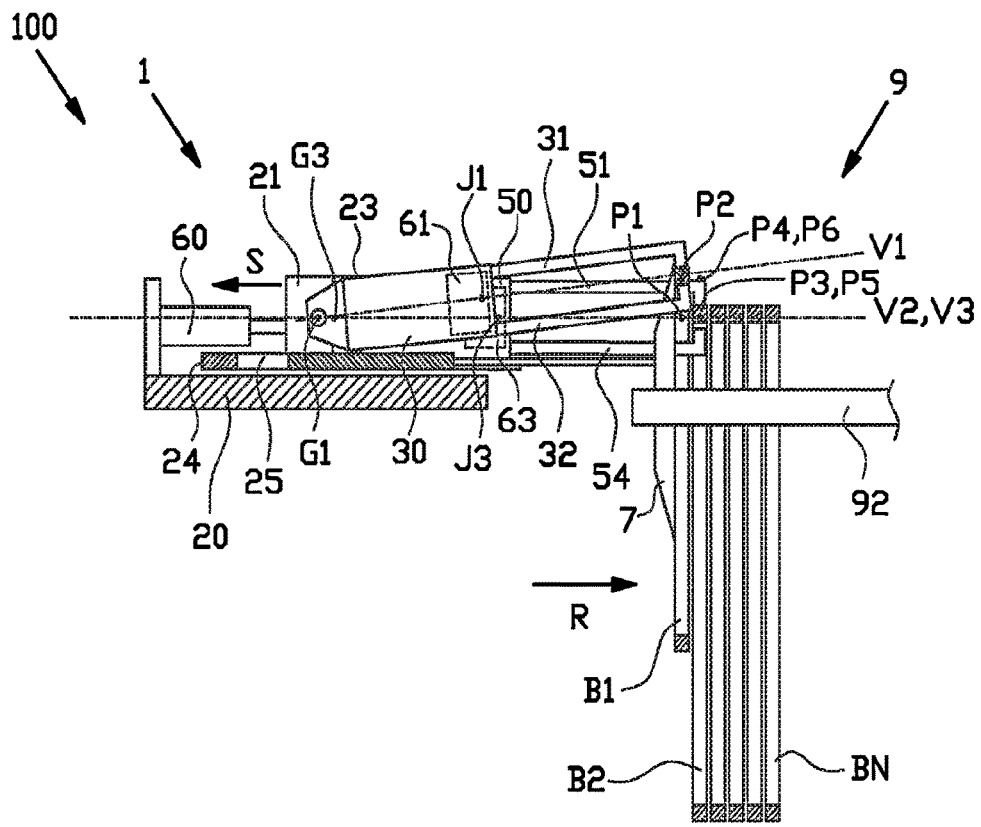

As best seen in FIGS. 3A, 3B and 3C, the first gripper 3 comprises a first jaw base 30 supported on and/or coupled to said first gripper base 21 and a first jaw member 31 and a second jaw member 32 projecting from said first jaw base 30. The first jaw member 31 and the second jaw member 32 are movable towards each other from opposite sides of a first gripper plane V1 from an open state, as shown in FIG. 3A, towards a closed state, as shown in FIG. 3C. The first gripper 3 comprises a first jaw drive 61 for driving the movement of the respective jaw members 31, 32. In this exemplary embodiment, the first jaw drive 61 comprises a mechanism that causes the respective jaw members 31, 32 to hinge about a first jaw axis J1.

The first gripper plane V1 is defined by the first gripper 3, in particular by the first jaw drive 61 that determines the positions of the jaw members 31, 32 in the closed state. In this exemplary embodiment, the first gripper plane V1 extends horizontally or substantially horizontally when the first gripper 3 is in the position as shown in FIG. 3A. More in particular, the first gripper plane V1 extends parallel to or coincides with the first jaw axis J1.

The first gripper 3 is movable relative to the gripper base 21 to adjust the position or the first orientation of the first gripper plane V1, as shown when comparing FIGS. 3A and 3C. In particular, the first gripper 3 is movable relative to the first gripper base 21 between an inner first gripping position, as shown in FIGS. 3A and 3B, in which the first gripper plane V1 intersects with a first bead circumference position or a first bead diameter position P1 and an outer first gripping position, as shown in FIG. 3C, in which the first gripper plane V1 intersects with a second bead circumference position or a second bead diameter position P2 different from outside the first bead diameter position P1. In particular, the outer first gripping position and/or the second bead diameter position P2 is above or radially outside the inner first gripping position and/or the first bead diameter position P1, considered with respect to the center of the single bead B1 to be separated. It will be clear that the first gripper 3 can also be steplessly moved to any bead diameter position between the first bead diameter position P1 and the second bead diameter position P2.

In the context of the present invention, the term 'bead circumference position' or 'bead diameter position' should be interpreted as a point in space that coincides with the circumference, the diameter or the radius of a bead, as supported by the bead supply unit 9, at the position of the first gripper 3, for a range of bead diameters D1, D2. As shown in FIG. 2, depending on the diameter D1, D2 of the beads B1-Bn, the circumference, diameter or radius of the bead B1-Bn at the position of the first gripper 3 may differ between the bead diameter positions P1, P2 as shown.

As shown when comparing FIGS. 3A and 3C, the first gripper 3 is pivotable, tiltable or rotatable relative to the first gripper base 21 about a first gripper axis G1 parallel or substantially parallel to the first gripper plane V1 and transverse or perpendicular to the separation direction S. The first gripper axis G1 is also parallel or substantially parallel to the f first jaw axis J1. Alternatively, the first gripper 3 may be linearly movable with a component perpendicular to the first gripper axis G1, for example vertically or substantially vertically.

As shown by comparing FIGS. 3B and 3C, the first gripper 3 is arranged to lift itself up from the inner first gripping position, as shown in FIG. 3B, towards the outer first gripping position, as shown in FIG. 3C, as a result of contact of one of the first jaw member 31 and the second jaw member 32 with the single bead B1. In other words, the bead separator 1 is configured to allow the first gripper 3 to passively move relative to first gripper base 21 in response to contact of one of the first jaw member 31 and the second jaw member 32 with the single bead B1.

Alternatively, the first gripper 3 may be configured to push itself down the outer first gripping position towards the inner first gripper position, for example against a bias that keeps the first gripper 3 in the outer first gripping position until the second jaw member 32 contacts the single bead B1. The first gripper 3 may further be arranged to lift itself up or push itself down from any intermediate position between the first gripping position and the second gripping position.

In the context of the present invention, the term 'passively' should be interpreted as a movement that is not directly controlled and/or driven by a drive member. In other words, there is no dedicated drive for actively moving the first gripper 3 relative to the first gripper base 21. Instead, the first gripper 3 can passively adapt or adjust its orientation relative to the first gripper base 21, for example as a result of contact between the first gripper 3 and the single bead B1. More specifically, it is noted that in the absence of a bead B1-Bn to engage onto, the first gripper 3 can be freely moved with respect to the first gripper base 21 about the first gripper axis G1.

As shown in FIGS. 1 and 3A, the bead separator 1 further comprises one or more stopper members 7, in this example one, that are arranged for moving together with the first gripper 3 in the pick-up direction R. In particular, the stopper member 7 may be coupled to or formed as an integral part of the first gripper base 21. When using more than one stopper member 7, the single bead B1 can be kept in position more accurately. The one or more stopper members 7 are configured for physically contacting the single bead B1 in the pick-up direction R when the first gripper 3 is moved in the pick-up position. More specifically, the one or more stopper members 7 are strategically positioned to contact the single bead B1 in the pick-up direction R when the first gripper 3 is in a pick-up position in which the respective jaw members 31, 32, when moved into the closed state, should be able to engage the single bead B1. The one or more stopper members 7 may be configured to send a signal that causes the separation drive 60 to stop moving the first gripper 3 in the pick-up direction R.

Figure 4:
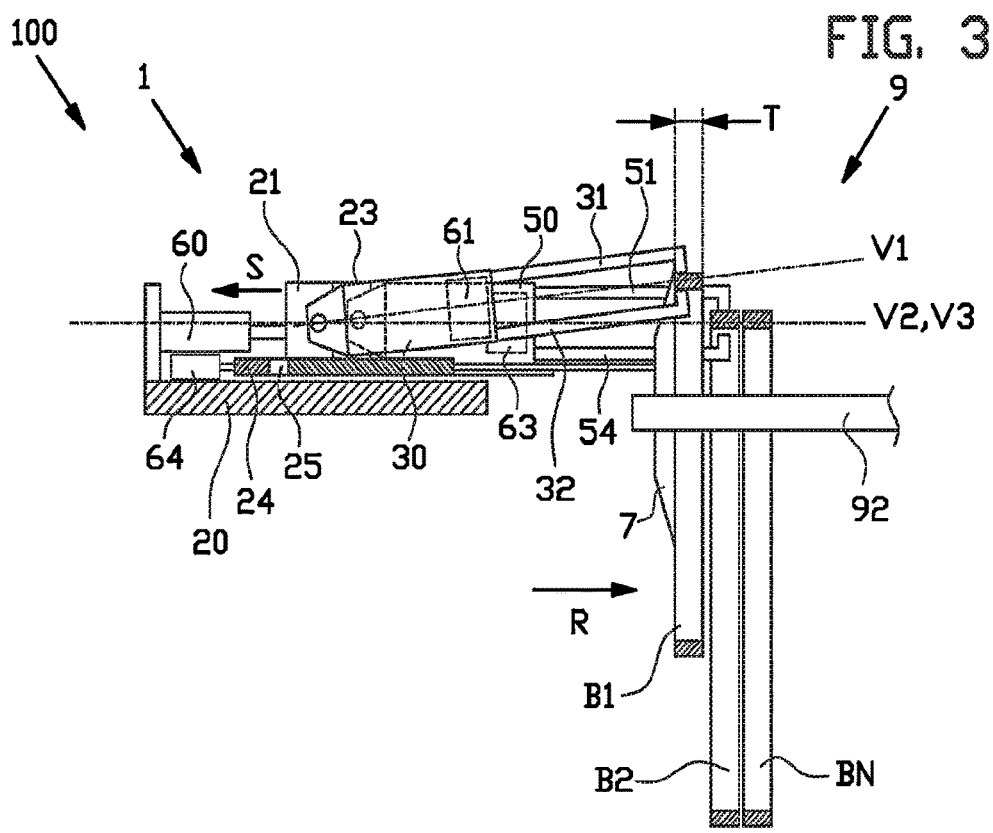
FIG. 4 shows a cross section of the bead separator and the bead supply unit according to the line III-III in FIG. 1, after the bead separator has been adjusted to remove a single bead of a different thickness from the bead supply unit.

As shown in FIG. 1, the second gripper 4 and the third gripper 5 are positioned or dimensioned to extent slightly beyond the reach of the first gripper 3, in particular up to a position in the pick-up direction R that corresponds to the position of the first bead B2 of the rest of the plurality of beads B2-Bn supported on the bead supply unit 9. As shown when comparing FIGS. 3C and 4, the relative position or spacing between the first gripper 3 and the second/third gripper 4, 5 can be adjusted to account for variations in bead thickness or width W, considered in the separation direction S, for example by controlling the previously discussed gripper spacing drive 64. The second gripper 4 and the third gripper 5, like the first gripper 3, each comprise a first jaw member 41, 51 and a second jaw member 42, 52 which are movable towards each other from opposite sides of a second gripper plane V2 and a third gripper plane V3, respectively, into a closed state for gripping the first bead B2 of the rest of the plurality of beads B2-Bn. The second gripper 4 and the third gripper 5 each comprise a respective jaw drive 62, 63 for driving the movements of the respective jaw members 41, 42, 51, 52, in particular in a hinging movement about respective jaw axes J2, J3. The second gripper 4 and the third gripper 5 can be operated in substantially the same way as the first gripper 3, which operation will not be repeated hereafter.

The second gripper 4 and the third gripper 5 are both movable relative to their respective gripper bases 22, 23 in a way similar to the movement of the first gripper 3 relative to the first gripper base 21, i.e. passively. Specifically, the second gripper 4 and the third griper 5 are movable between an inner second gripping position and an outer second gripping position and between an inner third gripping position and an outer third gripping position, respectively. The movement allows the second gripper 4 to adapt the orientation of the second gripper plane V2 such that it intersects with a third bead diameter position P3, a fourth bead diameter position P4 or any bead diameter position in between, in accordance with the bead diameter position of the first bead B2 of the rest of the plurality of beads B2-Bn at the respective position of the second gripper 4. Similarly, the movement allows the third gripper 5 to adapt the orientation of the third gripper plane V3 such that it intersects with a fifth bead diameter position P5, a sixth bead diameter position P6 or any bead diameter position in between. Preferably, the second gripper 4 and the third gripper 5 are movable relative to their respective gripper bases 22, 23 independently of each other.

Consequently, the first gripper 3, the second gripper 4 and/or the third gripper 5 according to the present invention are highly adaptable to engage, separate, fix and/or retain beads B1-Bn of different diameters D1, D2, by passively, freely and/or automatically repositioning the respective gripper planes V1, V2, V3 to match the bead diameter position at the locations of the respective grippers 3, 4, 5.

Figure 5:
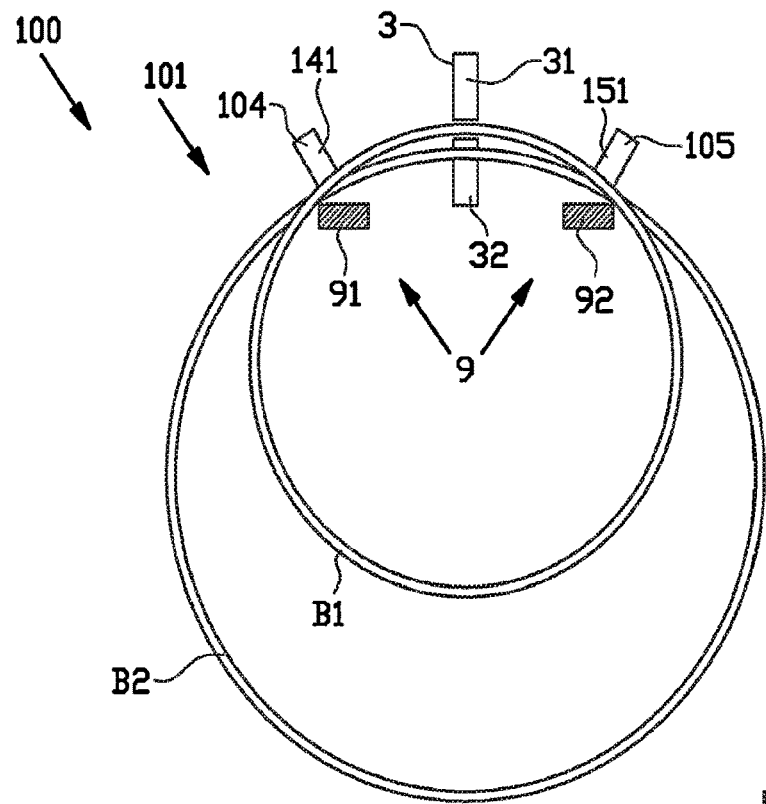
FIG. 5 shows a cross section, similar to FIG. 2, of an alternative bead separator and bead supply unit according to a second exemplary embodiment of the invention.

FIG. 5 shows an alternative bead separator 101 according to a second embodiment of the invention which differs from the previously discussed bead separator 1 in that the second gripper 104 comprises a single jaw member 141 which, in the absence of an opposite jaw member, is arranged to cooperate with the first carrier 91 of the bead supply unit 9 for gripping the first bead B2 of the rest of the plurality of beads B2-Bn. Similarly, the third gripper 105 comprises a single jaw member 151 which, in the absence of an opposite jaw member, is arranged to cooperate with the second carrier 92 of the bead supply unit 9 for gripping the first bead B2 of the rest of the plurality of beads B2-Bn. Because the bead diameter positions of the first bead B2 are more or less the same at the positions of the respective carriers 91, 92, regardless of the bead diameter, the second gripper 104 and the third gripper 105 can still reliably grip and fixate said first bead B2 on the bead supply unit 9. In this alternative embodiment, the second gripper 104 and the third gripper 105 do not need to be movable with respect to their respective gripper bases.

Figure 6:
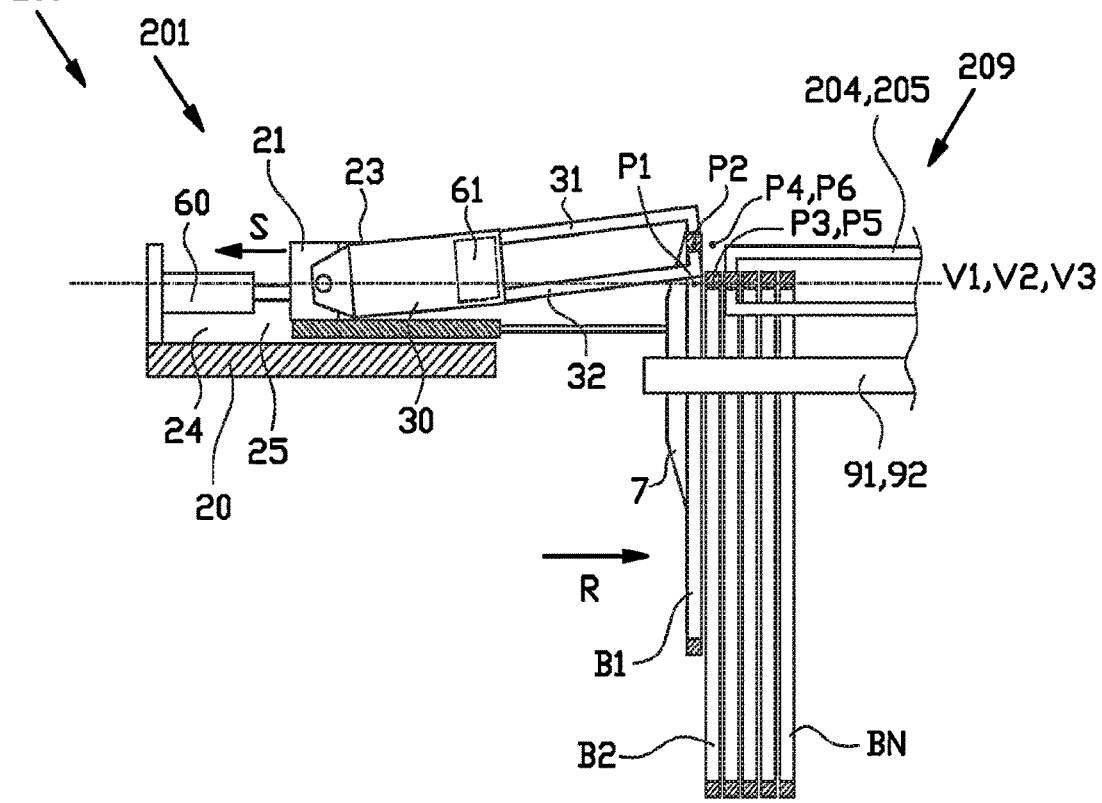
FIG. 6 shows a cross section, similar to FIG. 3C, of a further alternative bead separator and bead supply unit according to a third exemplary embodiment of the invention.

FIG. 6 shows an alternative bead supply station 200 which differs from the previously discussed bead supply station 100 only in that it is the bead supply unit 209 instead of the bead separator 201 that comprises the second gripper 204 and the third gripper 205 for fixating the rest of the plurality of beads B2-Bn at the bead supply unit 209.

Figure 7:
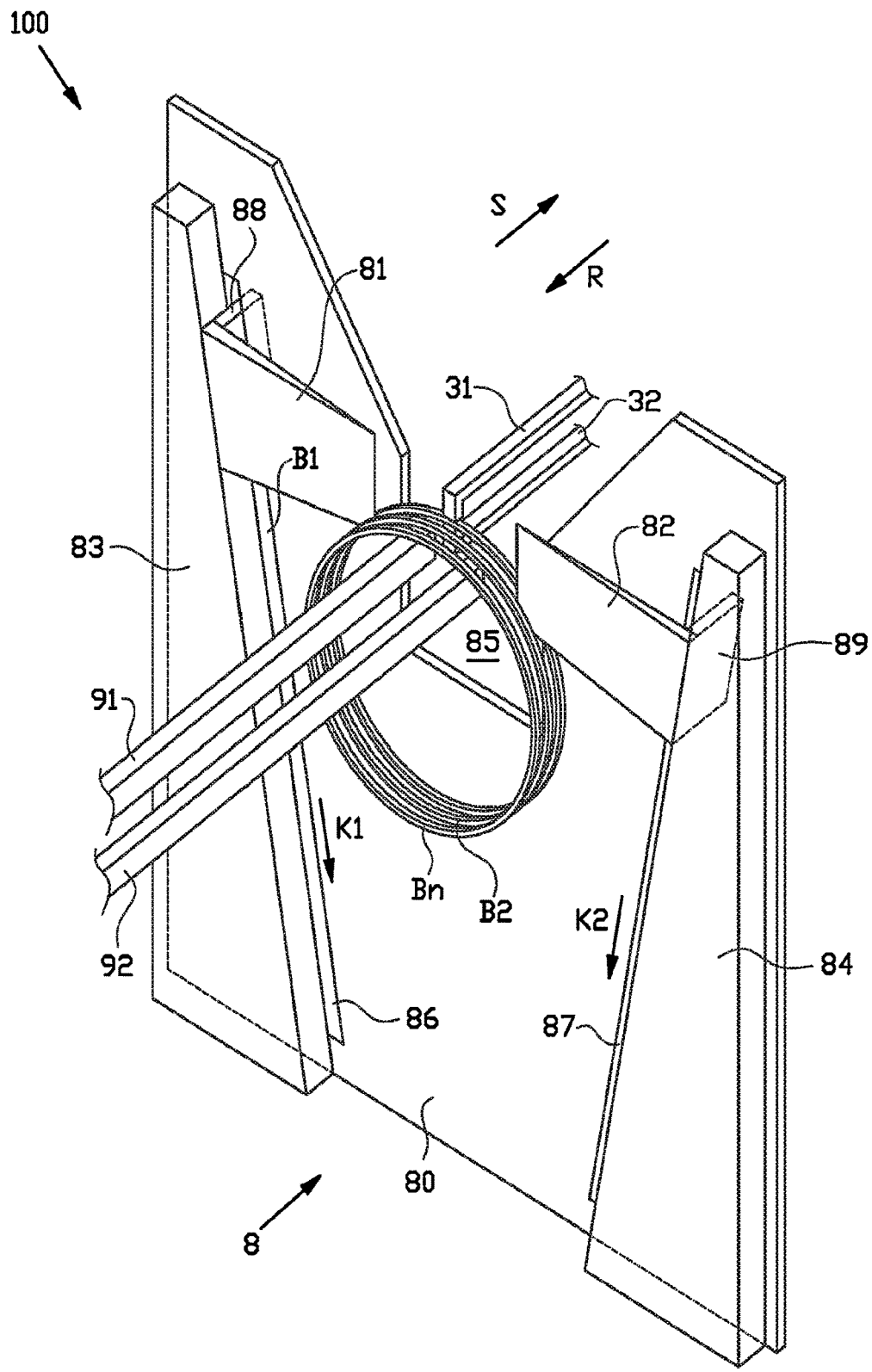
FIGS. 7 and 8 show an isometric front view and a rear view of the bead separator and the bead supply unit according to FIG. 1.

As shown in FIG. 1, the bead supply station 100 further comprises a guillotine separator 8 for slicing through the space between the single bead B1 and the rest of the plurality of beads B2-Bn to make sure that the single bead B1 no longer sticks to the rest of the plurality of beads B2-Bn along its circumference. As best seen in FIG. 7, the guillotine separator 8 comprises a first guillotine member 81 and a second guillotine member 82 which are movable in converging guillotine directions K1, K2 along a first guide 83 and a second guide 84. The guillotine separator 8 further comprises a guillotine plate 80 for supporting the guides 83, 84 with respect to each other. The guillotine members 81, 82 are positioned relative to the guides 83, 84 and/or the guillotine plate 80 such that there is a spacing between the guillotine plate 80 and the guillotine members 81, 82 that is sufficient to accommodate the single bead B1 when it is engaged by the jaw members 31, 32 of the first gripper 3.

The guillotine plate 80 is further provided with a gripper opening 85 for facilitating unhindered interaction between the one or more grippers 3, 4 and/or the one or more carriers 91, 92 through said guillotine plate 80. The guillotine members 81, 82 extend in a lateral direction parallel to the guillotine plate 80 up to, but not across, the gripper opening 85 to slice along sections of the circumference of the single bead B1 that is outside of said gripper opening 85. The positioning of the guillotine members 81, 82 relative to the gripper opening 85 reduces the risk of the guillotine members 81, 82 pinching anything in the gripper opening 85.

Figure 8:
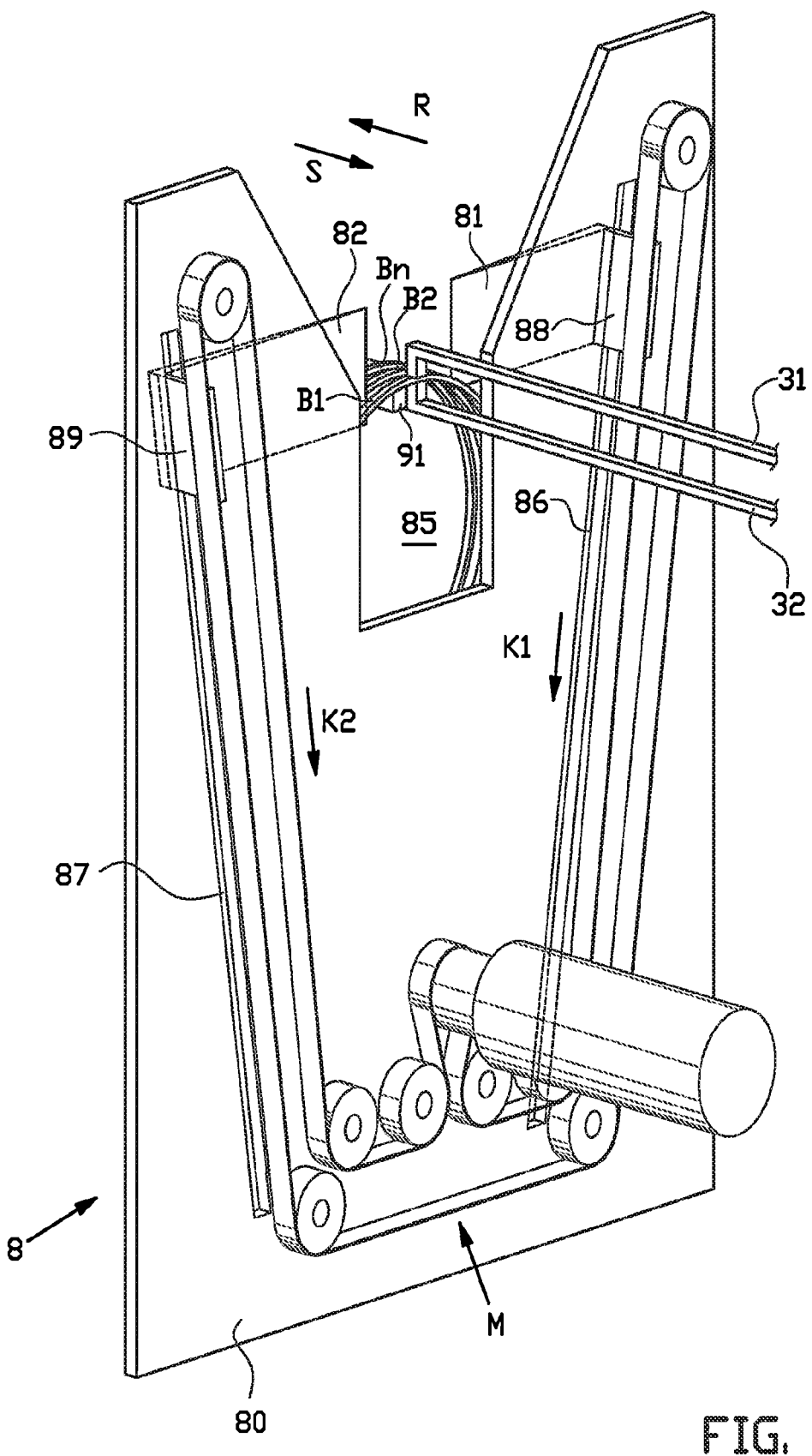

As shown FIG. 8, the guillotine members 81, 82 are driven to move in the respective guillotine directions K1, K2 by a guillotine drive M. In this example, the guillotine drive M comprises a timing belt, a set of pulleys for guiding the timing belt and a motor for rotating one of the pulleys that moves the timing belt. Alternatively, any other suitable drive mechanisms, for example a linear drive such as a pneumatic cylinder or a servo motor, may be used. The guillotine drive M is arranged or located at the opposite of the guillotine plate 80 with respect to the guillotine members 81, 82. The guillotine drive M is preferably mounted to and/or supported by the guillotine plate 80, just like the guides 83, 84 at the opposite side. Hence, the guillotine drive M and the guides 83, 84 can already be accurately positioned and/or aligned with respect to each other prior to adding the guillotine separator 8 to the bead supply station 100. Hence, tolerances can be minimized.

The guillotine plate 80 is provided with a first slot 86 and a second slot 87 for allowing coupling and/or connection of the guillotine members 81, 82 to the guillotine drive M through the guillotine plate 80. In particular, the guillotine separator 8 further comprises a first coupler 88 and a second coupler 89 reaching through the slots 86, 87 from the side of the guides 81, 82 to the side of the guillotine drive M, and connected to both. The slots 86, 87 extend parallel to the respective guillotine directions K1, K2.

Alternatively, the couplers 88, 89 may reach across an outer contour of the guillotine plate 80 to interconnect the respective guillotine members 81, 82 with the guillotine drive M without the need for slots.

A method for separating the single bead B1 from the bead supply unit 9, 209 with the use one of the previously discussed bead separators 1, 101, 201 will now be briefly elucidated with reference to FIGS. 3A, 3B and 3C.

FIG. 3A shows the situation in prior to engaging and separating the single bead B1. The jaw members 31, 32, 41, 42, 51, 52 of the respective grippers 3, 4, 5 are in the open state, ready to be operated by the respective jaw drives 61, 62, 63 towards the closed state.

FIG. 3B shows the situation in which the jaw members 31, 32 of the first gripper 3 have been moved towards the closed state, until the first jaw member 31 contacts the single bead B1 from above at or near the second bead diameter position P2. The jaw members 41, 42, 51, 52 of the second gripper 4 and the third gripper 5 may already have reached their respective closed states, or may be in a similar state as the jaw members 31, 32 of the first gripper 3.

FIG. 3C shows the situation in which the first jaw drive 61 has continued to drive the jaw members 31, 32 of the first gripper 3 to move into the closed state, thereby causing the first gripper 3 to lift itself from the inner first gripping position, as shown in FIG. 3B, into the outer first gripping position, as shown in FIG. 3C, thereby reorienting and/or displacing the first gripper plane V1 until, ultimately, both jaw members 31, 32 are engaged with and/or gripping the single bead B1 from opposite sides of said first gripper plane V1.

It will be clear to one skilled in the art that in a case in which the diameters D1, D2 of the single bead B1 and the first bead B2 of the rest of the plurality of beads B2-Bn was reversed, the second gripper 4 and the third gripper 5 would be lifted in a similar way to the first gripper 3 to engage the first bead B2 of the rest of the plurality of beads B2-Bn in the fourth bead diameter position P4 and the sixth bead diameter position P6, respectively, while the first gripper 3 would be allowed to remain at the first bead diameter position P1.

Once the first gripper 3 has securely engaged the single bead B1 and the second gripper 4 and the third gripper 5 have securely fixated the rest of the plurality of beads B2-Bn on the bead supply unit 9, the separation drive 60 may be activated to retract the first gripper 3 in the separation direction S, thereby effectively separating the single bead B1 from the rest of the plurality of beads B2-Bn (not shown and known per se).

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 bead separator
20 separator base
21 first gripper base
22 second gripper base
23 third gripper base
24 common gripper base
25 recess
3 first gripper
30 jaw base
31 first jaw member
32 second jaw member
4 second gripper
5 third gripper
60 separation drive
61 first jaw drive
62 second jaw drive
63 third jaw drive
64 gripper spacing drive
7 stopper member
8 guillotine separator
80 guillotine plate
81 first guillotine member
82 second guillotine member
83 first guide
84 second guide
85 gripper opening
86 first slot
87 second slot
88 first coupler
89 second coupler
9 bead supply unit
91 first carrier
92 second carrier
100 bead supply station
101 alternative bead separator
104 second gripper
141 single jaw member
105 third gripper
151 single jaw member
200 alternative bead supply station
201 alternative bead separator
204 second gripper
205 third gripper
B1 first bead
B2 second bead
Bn further bead(s)
D1 first bead diameter
D2 second bead diameter
G1 first gripper axis
G2 second gripper axis
G3 third gripper axis
J1 first jaw axis
J2 second jaw axis
J3 third jaw axis
K1 first guillotine direction
K2 second guillotine direction
M guillotine drive
P1 first bead diameter position
P2 second bead diameter position
P3 third bead diameter position
P4 fourth bead diameter position
P5 fifth bead diameter position P6 sixth bead diameter position
R pick-up direction
S separation direction
T bead thickness
V1 first gripper plane
V2 second gripper plane
V3 second gripper plane

The invention claimed is:

1. A bead supply station comprising a bead supply unit for holding a plurality of beads, and a bead separator configured for separating a single bead from the bead supply unit holding a plurality of beads, wherein the bead separator comprises a first gripper configured for separating the single bead from the rest of the plurality of beads in a separation direction and a first gripper base configured for supporting said first gripper, wherein the first gripper comprises a first jaw member and a second jaw member which are movable towards each other from opposite sides of a first gripper plane defined by the first gripper into a closed state for gripping the single bead in said first gripper plane, wherein the first gripper is movable relative to the first gripper base between an inner first gripper position in which the first gripper plane intersects with a first bead diameter position and an outer first gripping position in which the first gripper plane intersects with a second bead diameter position different from the first bead diameter position.

2. The bead supply station according to claim 1, wherein the first gripper is movable in a passive, uncontrolled manner relative to first gripper base in response to contact of one of the first jaw member and the second jaw member with the single bead.

3. The bead supply station according to claim 1, wherein the outer first gripping position is above the inner first gripping position, wherein the first gripper is configured to lift itself up from the inner first gripping position towards the outer first gripping position or to push itself down from the outer first gripping position towards the inner first gripping position, as a result of contact of one of the first jaw member and the second jaw member with the single bead.

4. The bead supply station according to claim 1, wherein the first gripper comprises a first jaw drive configured for moving the first jaw member and the second jaw member from an open state towards the closed state.

5. The bead supply station according to claim 1, wherein the first gripper is rotatable relative to the first gripper base about a first gripper axis parallel to the first gripper plane and transverse or perpendicular to the separation direction.

6. The bead supply station according to claim 5, wherein at least one of the first jaw member and the second jaw member is rotatable relative to the other of the first jaw member and the second jaw member about a first jaw axis, wherein the first gripper axis is parallel to said first jaw axis.

7. The bead supply station according to claim 1, wherein the bead separator further comprises a separator base configured for supporting the first gripper base, wherein the first gripper base is movable relative to the separator base in the separation direction.

8. The bead supply station according to claim 1, wherein the first gripper plane extends horizontally when the first gripper is in the inner first gripping position.

9. The bead supply station according to claim 1, wherein the first gripper plane extends parallel, transverse or obliquely to the separation direction when the first gripper is in one of the inner first gripping position and the outer first gripping position.

10. The bead supply station according to claim 1, wherein the first gripper is movable in a pick-up direction opposite to the separation direction into a pick-up position at the single bead, wherein the bead separator further comprises a stopper member that is arranged for moving together with the first gripper in the pick-up direction for contacting the single bead in said pick-up direction when the first gripper is in the pick-up position.

11. The bead supply station according to claim 1, wherein the bead separator further comprises a second gripper configured for fixating the rest of the plurality of beads at the bead supply unit when the single bead is separated.

12. The bead supply station according to claim 11, wherein the second gripper comprises a first jaw member and a second jaw member which are movable towards each other from opposite sides of a second gripper plane defined by the second gripper into a closed state for gripping the first bead of the rest of the plurality of beads in said second gripper plane, wherein the second gripper is supported by and movable relative to a second gripper base between an inner second gripping position in which the second gripper plane intersects with a third bead diameter position and an outer second gripping position in which the second gripper plane intersects with a fourth bead diameter position different from the third bead diameter position.

13. The bead supply station according to claim 12, wherein the first gripper and the second gripper are independently movable relative to the first gripper base and the second gripper base, respectively.

14. The bead supply station according to claim 12, wherein the first gripper base is movable relative to the second gripper base in the separation direction.

15. The bead supply station according to claim 11, wherein the bead separator comprises a second gripper base configured for supporting the second gripper, wherein the bead separator further comprises a separator base configured for supporting the first gripper base and the second gripper base, wherein the second gripper base is movable relative to the separator base in a pick-up direction opposite to the separation direction.

16. The bead supply station according to claim 11, wherein the second gripper is located at a first side of the first gripper in a lateral direction parallel to the first gripper plane and perpendicular to the separation direction, wherein the bead separator further comprises a third gripper, at a second side of the first gripper opposite to the first side, configured for fixating the rest of the plurality of beads at the bead supply unit when the single bead is separated.

17. The bead supply station according to claim 16, wherein the second gripper and the third gripper are independently movable.

18. The bead supply station according to claim 16, wherein the bead separator comprises a common gripper base configured for supporting the second gripper and the third gripper, wherein the common gripper base is provided with a recess at the position of the first gripper base.

19. The bead supply station according to claim 1, wherein the bead supply unit comprises at least one carrier extending in the separation direction configured for supporting the plurality of beads.

20. The bead supply station according to claim 19, wherein the first gripper is movable parallel to the at least one carrier.

21. The bead supply station according to claim 1, wherein the bead supply unit further comprises a second gripper or a third gripper configured for fixating the rest of the plurality of beads at the bead supply unit when the single bead is separated.

22. A method for separating a single bead from a bead supply unit holding a plurality of beads using the bead supply station according to claim 1, wherein the method comprises the steps of:
- moving the first jaw member and the second jaw member towards each other from the opposite sides of the first gripper plane into the closed state for gripping the single bead in said first gripper plane;
- moving the first gripper relative to the first gripper base between the inner first gripping position and the outer first gripping position; and
- moving the first gripper in the separation direction to separate the single bead from the rest of the plurality of beads.

23. The method according to claim 22, wherein the first gripper is moved in a passive, uncontrolled manner relative to first gripper base in response to contact of one of the first jaw member and the second jaw member with the single bead.

24. The method according to claim 22, wherein the outer first gripping position is above the inner first gripping position, wherein the first gripper lifts itself up from the inner first gripping position towards the outer first gripping position or pushes itself down from the outer first gripping position towards the inner first gripping position as a result of contact of one of the first jaw member and the second jaw member with the single bead.

25. The method according to claim 22, wherein the bead separator further comprises a second gripper, wherein the method further comprises the step of:
- fixating the rest of the plurality of beads at the bead supply unit with the second gripper when the single bead is separated.

26. The method according to claim 25, wherein the second gripper is moved relative to the bead supply unit in a pick-up direction opposite to the separation direction.

* * * * *